(12) United States Patent
Kume et al.

(10) Patent No.: US 6,219,328 B1
(45) Date of Patent: Apr. 17, 2001

(54) DISC ROTATING APPARATUS

(75) Inventors: Hideki Kume; Toshiharu Hibi; Teruaki Sogawa, all of Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/183,936

(22) Filed: Nov. 2, 1998

(30) Foreign Application Priority Data

Oct. 31, 1997 (JP) .................................................. 9-009659
Oct. 31, 1997 (JP) .................................................. 9-009661
Oct. 31, 1997 (JP) .................................................. 9-300221

(51) Int. Cl.$^7$ ............................................... G11B 17/028
(52) U.S. Cl. ......................................................... 369/269
(58) Field of Search ............................ 360/97.02, 98.08, 360/99.12, 99.04; 369/258, 263, 268, 270, 251; 310/51, 67; 68/23.2; 74/798

(56) References Cited

U.S. PATENT DOCUMENTS

| | | | | |
|---|---|---|---|---|
| 4,617,838 | * | 10/1986 | Anderson | 74/798 |
| 5,555,233 | * | 9/1996 | Yano et al. | 369/270 |
| 5,806,349 | * | 9/1998 | Kim et al. | 68/23.2 |
| 5,903,540 | * | 5/1999 | Ro et al. | 369/263 |
| 6,005,311 | * | 12/1999 | Matsushima | 310/51 |
| 6,005,749 | * | 12/1999 | Ikuta et al. | 360/99.12 |

FOREIGN PATENT DOCUMENTS

| | | |
|---|---|---|
| 2-139758 | 5/1990 | (JP) . |
| 51-73318 | 7/1993 | (JP) . |
| 63-15079 | 11/1994 | (JP) . |
| 410320876 | * 12/1998 | (JP) . |
| 411041857 | * 2/1999 | (JP) . |

* cited by examiner

*Primary Examiner*—Brian E. Miller
*Assistant Examiner*—Tianjie Chen
(74) *Attorney, Agent, or Firm*—Lackenbach Siegel

(57) ABSTRACT

A disc rotating apparatus includes a turntable for placing thereon a disc such as CD, DVD. The disc is clamped by the turntable and the disc holding frame. The holding frame is formed, at its main body, with an annular groove. The annular groove is circumferentially partitioned by a plurality of partition walls to thereby provide a plurality of accommodating portions. Each of the accommodating portions accommodates therein one or two or more steel balls. Due to rotation of the turntable or disc, each steel ball is displaced within the accommodating portion, thereby correcting for an unbalanced state wherein a center of gravity of the disc is deviated from an axis of a rotary shaft of turntable.

2 Claims, 8 Drawing Sheets

FIG. 8
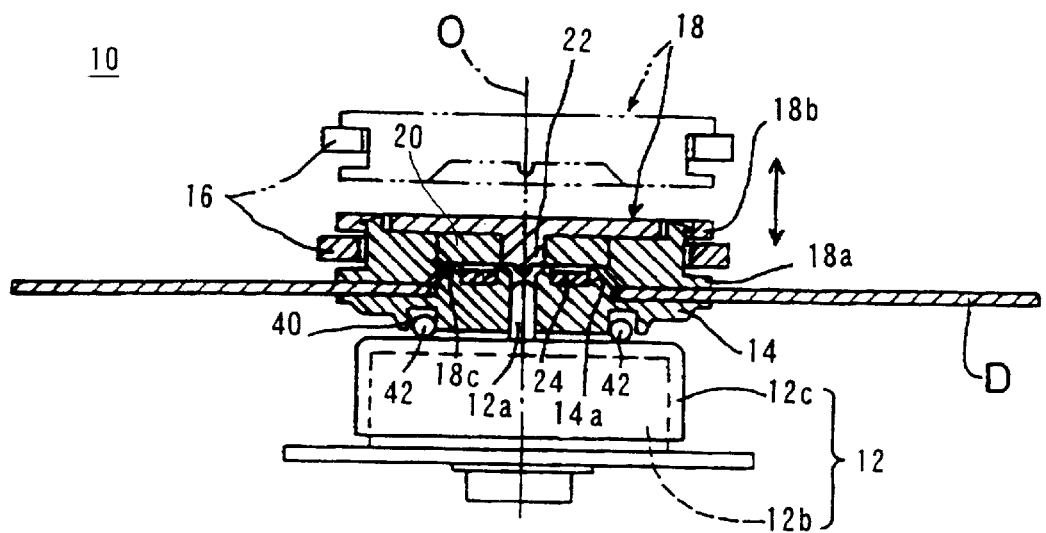
GIG. 9
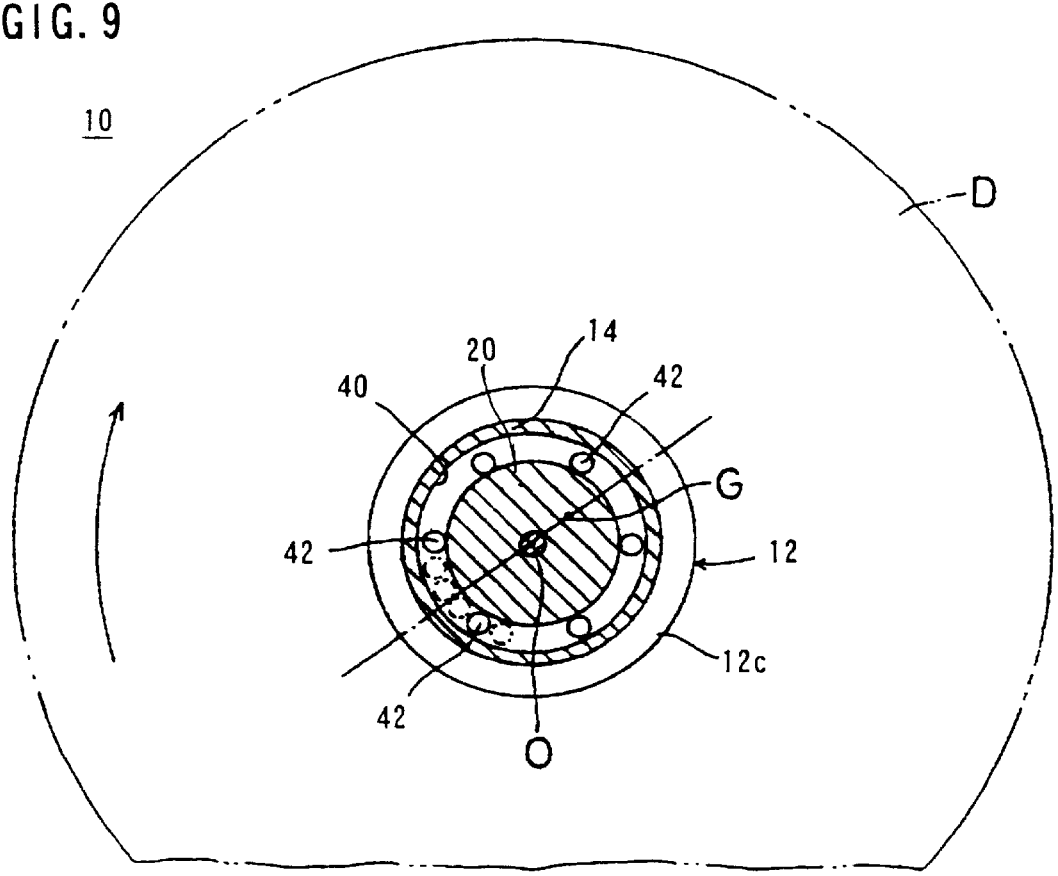

DISC ROTATING APPARATUS

BACKGROUND OF THE INVENTION

1. Field of the Invention

The present invention relates to disc rotating apparatuses. More particularly, the invention relates to a structure that corrects for wow and flutter or rotation deflection caused due to deviation in position between a spindle motor rotation axis about which the turntable rotates at high speeds and a center of gravity of a disc being mounted on the turntable (may be hereinafter referred to as an "unbalanced state" or "deviation in center of gravity"), for a disc player to reproduce, record or erase information memorized on a disc recording medium (hereinafter merely referred to as a "disc") such as an optical disc, magnet-optical disc or the like.

2. Description of the Prior Art

If such a turntable as above is rotated at a high speed in a state of unbalance or position deviation in center of gravity, the turntable becomes vibrating thereby causing reproduction error and the like. In order to prevent this, there conventionally has been a rating that the deviation in center of gravity be specified to 1 g. cm or less.

Under such a situation, various proposals have been made in order to reduce wow and flutter or rotation deflection caused due to deviation in center of gravity. For example, Japanese Patent Laying-open No. S51-73318 discloses a first prior art. This prior art has a sensor arranged on the turntable to detect a deviated center of gravity, and a movement adjusting mechanism using a bimetal member arranged under the turntable so that the movement adjusting mechanism can be controlled by a signal supplied from the sensor.

In this first prior art, however, the sensor and the movement adjusting mechanism have to be arranged at a location close to the turntable, making the structure complicate. Furthermore, the movement adjusting mechanism requires a means for controlling it, resulting in inexpensive cost.

As a second prior art, there is a technology as disclosed, for example, in Japanese Patent Laying-open No. S63-15079 and Japanese Patent Laying-open No. H2-139758. According to this technology, an annular liquid tank is provided in the turntable so that an unbalanced state can be corrected for by a liquid filled within the liquid tank. This second prior art requires to enclose a liquid within the liquid tank. However, this enclosure is complicate in structure hence requiring expensive cost.

Meanwhile, there is a third prior art depicted in FIG. 1. The disc player 1 of the prior art in FIG. 1 includes a turntable 2 firmly fixed on an rotary shaft 3a of a spindle motor 3. Around an outer periphery of the turntable 2 a swing frame 4 is fitted, and a disc holding frame 5 is supported by the swing frame 4. The holding frame 5 has a frame main body 5a almost in the same diameter as that of the turntable 2, and a lid 5b fitted over a top surface of the frame main body 5a. The frame main body 5a has an opening 5c formed at a center thereof. The lid 5b and the frame main body 5a define therebetween a space, at a central location of which a ring magnet 6 is placed. This ring magnet 6 is fitted over an outer periphery of a projection 7 formed at almost a center of the lid 5b. The turntable 2 is formed, at its center, with a projection 2a having an annular recess formed therein so that a magnetic ring 8, for example, of an iron or the like is placed in the annular recess.

In the FIG. 1 prior art, a disc D is mounted on the turntable 2 in a state that the disc holding frame 5 is positioned distant from the turntable 2. By lowering the swing frame 4, a magnetic attractive force is acted upon between the ring magnet 6 and the magnetic ring 8 so that the holding frame 5 can hold the disc D onto the turntable 2. Due to this, the disc D is clamped between the holding frame 5 and the turntable 2. The spindle motor 3 is then driven to rotate the disc D through the turntable 2 at a high speed, and an optical pickup (not shown) is actuated. This makes it possible to reproduce the information memorized on the disc D, record information onto the disc D, or erase information memorized on the disc D.

In this prior art, an annular groove 9 is formed, about a center axis O of the rotary shaft 3a, at a location between the magnet ring 6 and the frame main body 5a of the disc holding frame 5 as shown in FIGS. 1 and 2, in order to prevent against an unbalanced state as stated before. A plurality of steel balls 9a for unbalance correction are distributed in the annular groove 9 so that the steel balls 9a can freely move in a circumferential direction of the annular groove 9. That is, the annular groove 9 has its width H somewhat greater than a diameter of the steel ball 9a so that the steel ball 9a can freely move in the circumferential direction of the annular groove 9.

With this structure, when an unbalanced state occurs, the steel balls 9a are moved to a position opposite to a center of gravity G of the disc D with respect to the axis O as shown by a virtual line in FIG. 2 by a centrifugal force due to high speed rotation of the turntable 2, thereby eliminating the unbalanced state.

In the prior art shown in FIGS. 1 and 2, however, all the steel balls 9a are moved to a position that is opposite to the center of gravity G and is an outer side of an inner wall of the annular groove 9. Consequently, unbalance correction is made by a constant amount for the turntable 2 in a fashion irrespective of a distance L of deviation of the center of the gravity G from the axis O. This, however, might cause over-correction as the case may be.

Moreover, in the prior arts of FIGS. 1 and 2, even where there exists almost no unbalanced state or deviation in center of gravity wherein the center of gravity G of the disc D and the axis O are coincident in position with each other, the steel balls 9a gathering together are magnetized by the magnet ring 6 and attracted to each other, as shown by the virtual line in FIG. 2. Thus there has been a problem that excessive increase in mass is encountered at around a portion where the steel balls 9a gather, rather giving rise to an unbalanced state.

SUMMARY OF THE INVENTION

It is therefore a primary object of the present invention to provide a novel disc rotating apparatus.

It is another object of the present invention to provide a disc rotating apparatus which can provide an optimal amount of unbalance correction.

It is still another object of the present invention to provide a disc rotating apparatus which is free from providing an excessive amount of unbalance correction.

It is further object of the present invention to provide a disc rotating apparatus having a simple and inexpensive structure to effectively eliminate an unbalanced state.

A disc rotating apparatus according to the present invention, comprises: a drive motor having a rotary shaft; a turntable firmly fixed on the rotary shaft; a disc holding member for holding a disc mounted on the turntable cooperatively with the turntable; a magnet provided on one of the turntable and the disc holding member; a magnetic member provided on the other of the turntable and the disc holding member and to be attracted by the magnet; a plurality of accommodating portions arranged in one of a top surface and a underside surface of the turntable in a circumferential direction of the turntable; and one or two or more balance correcting balls accommodated in the accommodating portions.

Because the unbalance correcting balls are restricted in movement in the circumferential direction of the turntable by the accommodating portion walls, the unbalance correcting balls are unlikely to gather to one certain position, thus effectively correcting for an unbalanced state.

Where the unbalance correcting balls are magnetic balls, the magnet has a magnetic attractive force in such a magnitude that the magnet ball is caused attracted onto an inner peripheral surface of the accommodating portion by overcoming a centrifugal force caused due to high speed rotation of the turntable when a center of gravity of the disc mounted on the turntable and an axis of the rotary shaft are in coincident or almost coincident in position with each other, and the magnetic ball is allowed to move toward an outer peripheral surface of the accommodating portion by being overcome by a centrifugal force due to high speed rotation of the turntable when the center of gravity of the disc mounted on the turntable and the axis of the rotary shaft are deviated from each other.

In such a case, when an unbalanced state is not present, i.e., when the center of gravity of the disc and the rotation shaft axis are in coincident in position with each other, the unbalance correcting balls are attracted onto an inner peripheral surface of each accommodating portion thereby maintaining a balanced stated. When an unbalanced state occurs, i.e., when the center of gravity of the disc is deviated from the rotation shaft axis, the unbalance correcting ball overcomes a magnet attractive force and moves toward an outer peripheral surface of each accommodating portion thereby effectively correcting for an unbalanced state.

The accommodating portions can be formed by the annular groove and a plurality of partition walls to partition the annular groove in the circumferential direction. Specifically, one of the magnet and the magnetic member is provided in one of the top surface and the underside surface of the turntable, the one of the magnet and the magnetic member being in circular, the disc holding member including a holding frame having an inner diameter greater than a diameter of the one of the magnet and the magnetic member, and the annular groove being formed at a location between the holding member and the one of the magnet and the magnetic member.

In a certain aspect, a disc rotating apparatus according to the present invention, comprises: a drive motor having a rotary shaft; a turntable firmly fixed on the rotary shaft; a disc holding member for holding a disc mounted on the turntable cooperatively with the turntable; a magnet provided on one of the turntable and the disc holding member; a magnetic member provided on the other of the turntable and the disc holding member to be attracted by the magnet; an annular groove formed in one of a top surface and an underside surface of the turntable; and a plurality of non-magnetic balls accommodated in the annular groove to be movable in a circumferential direction of the turntable.

If the unbalance correcting balls are formed by non-magnetic balls, it is possible to avoid an adverse affection by a magnet force of a magnet provided in the one of the turntable and the holding member. That is, the non-magnetic ball will not magnetized by the magnet. Accordingly, there is less possibility that the non-magnetic balls be attracted to and collected at one site, thus effectively correcting for an unbalanced state.

If a lubricative plating layer is formed over the outer surface of the non-magnetic ball, the non-magnetic ball would experience less friction in moving in the annular groove.

Meanwhile, where the annular groove is formed at an underside of the turntable, i.e., where the annular groove includes a lower annular groove, there is a necessity to provide a fall preventive member for preventing the non-magnetic balls from falling out of the lower annular groove.

The fall preventive member may be a rotor of a drive motor, or a separate support plate. In the case of using a support plate, an elastic member is preferably provided to elastically urge the support plate toward a turntable side.

The support plate can be vertically displaced in response to a rotation speed of the turntable by a support plate displacing means. That is, during a high speed rotation of the turntable, the support plate is displaced downward by overcoming the urging force of the elastic member. This allows the non-magnetic balls in the annular groove to freely move thereby effectively correcting for an unbalanced state. During a low speed rotation of the turntable, the support plate is displaced by the elastic member so that the non-magnetic ball is positioned fixed in the annular groove.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a sectional illustrative view showing essential parts of a disc player according to another embodiment of the present invention;

FIG. 9 is a plan illustrative view showing the FIG. 8 embodiment;

DETAILED DESCRIPTION OF THE PREFERRED EMBODIMENTS

Figure 3:
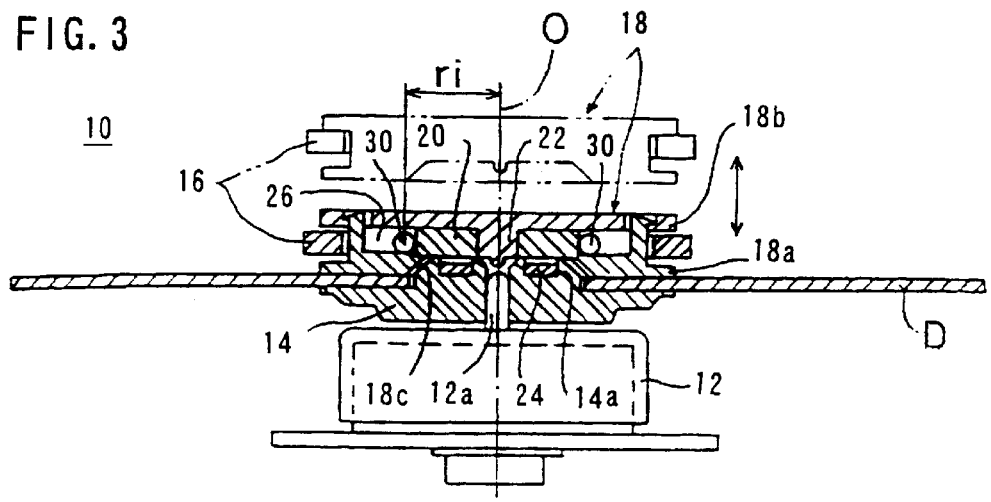
FIG. 3 is a sectional illustrative view showing essential parts of a disc player according to one embodiment of the present invention.
Figure 4:
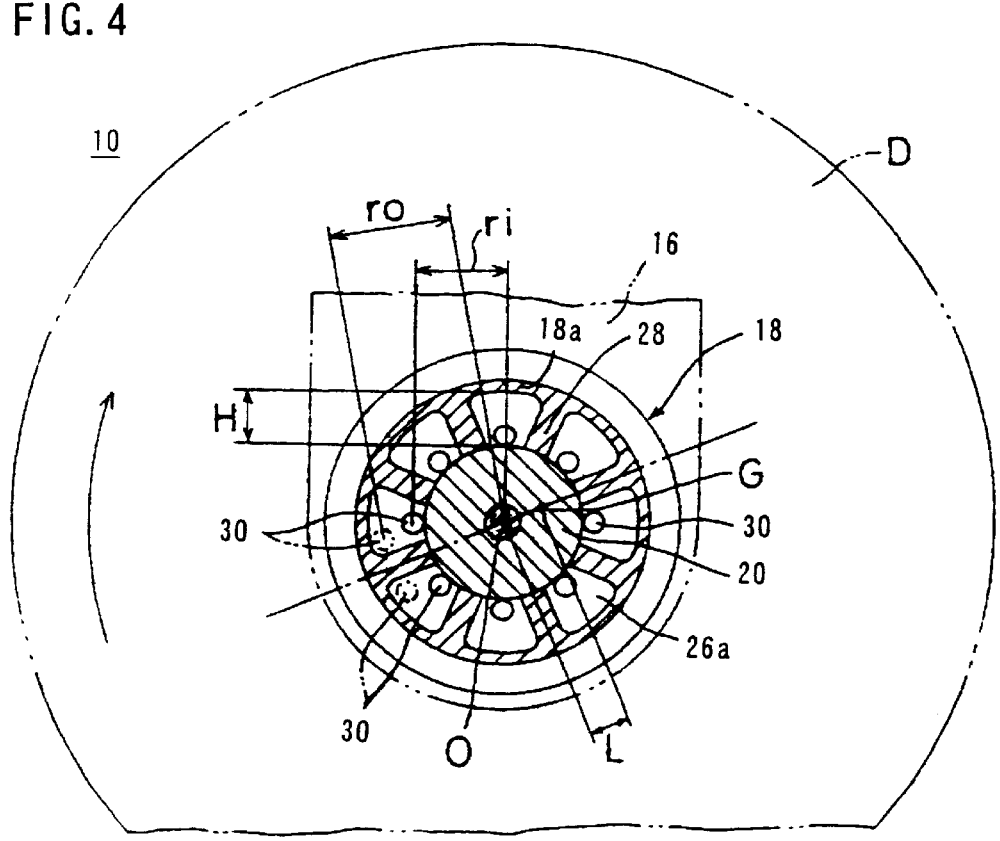
FIG. 4 is a plan illustrative view showing the FIG. 3 embodiment.
Figure 5:
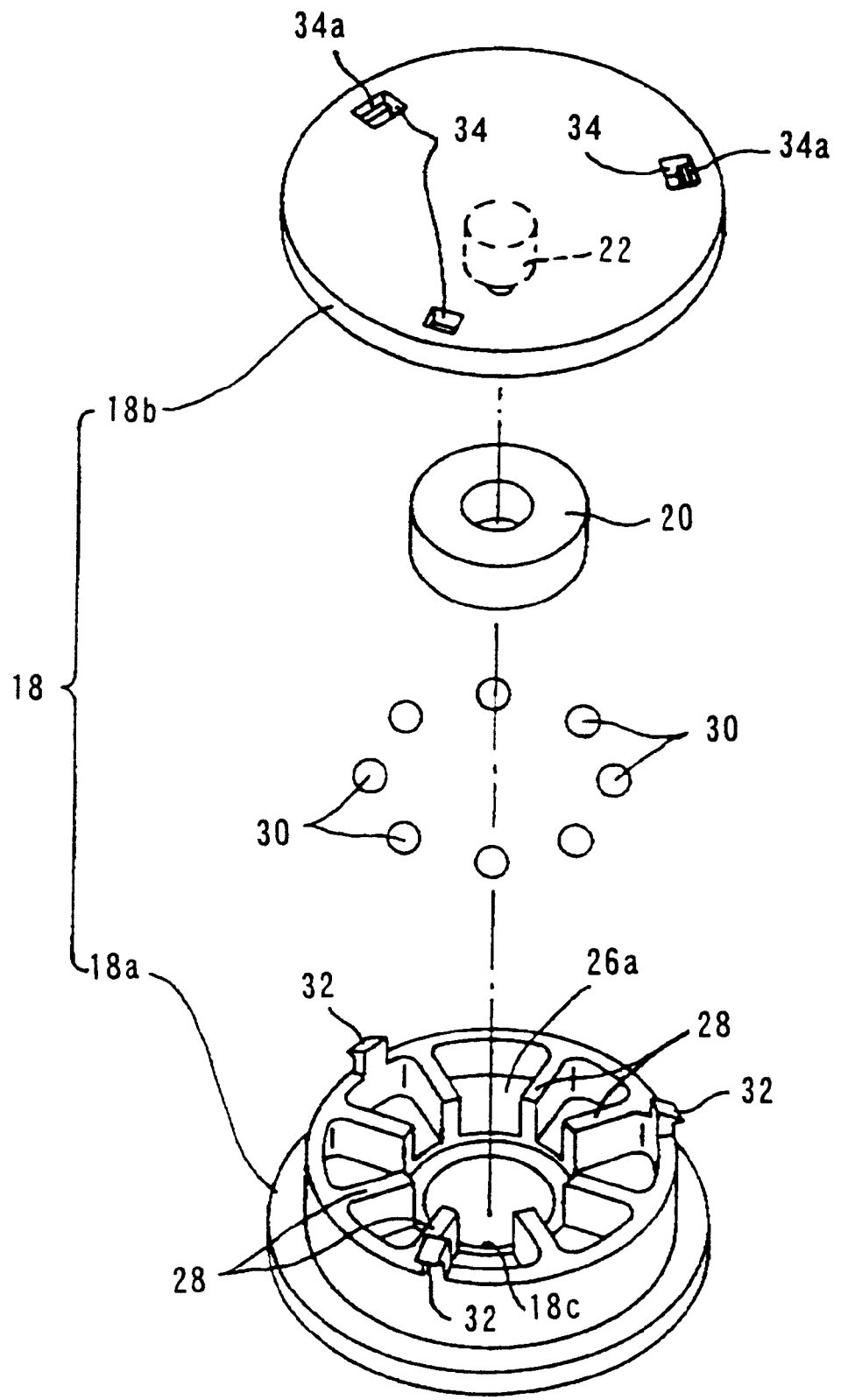
FIG. 5 is an exploded perspective view showing essential parts of the embodiment given in FIG. 3 and FIG. 4.

Referring now to FIGS. 3, 4 and 5, there is illustrated a disc player 10 according to one embodiment of the present invention which is usable for reproducing, recording or erasing information from or onto a disc, such as a CD, DVD. The disc player 10 includes a turntable 14 firmly fixed on a rotation shaft 12a of a spindle motor 12. The turntable 14 is fitted with a swing frame 16 at its outer periphery so that a disc holding frame 18 is supported by the swing frame 16. The holding frame 18 has a frame main body 18a having almost the same diameter as that of the turntable 14 and a lid 18b fitted on a top surface of the frame main body 18a. The frame main body 18a has an opening 18c formed at a center thereof. A ring magnet 20 is disposed at a center portion of a space defined between the lid 18b and the frame main body 18a. The ring magnet 20 is fitted over an outer periphery of a projection 22 formed almost at a center of the lid 18b. The turntable 14 is formed, at its center, with a protrusion 14a in which an annular recess is formed. The annular recess is received with a magnetic ring 24 formed, for example, of iron.

Figures 1, 2:
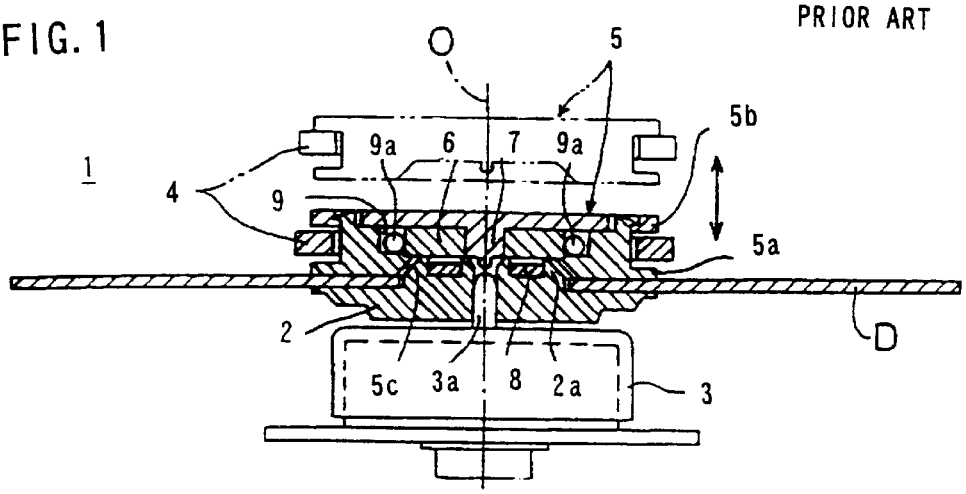
FIG. 1 is a sectional illustrative view showing essential parts of a conventional disc player as a third prior art to the present invention.
FIG. 2 is a plan illustrative view showing the FIG. 1 prior art.

In this embodiment, a disc D is mounted on the turntable 14 in a state that the disc holding frame 18 is positioned distant from the turntable 14, in a manner similar to the FIG. 1 prior art. If the swing frame 16 is lowered, a magnetic attracting force acts upon between the ring magnet 20 and the magnetic ring 24, through which the holding frame 18 can hold the disc D onto the turntable 14. Due to this, the disc D is clamped between the holding frame 18 and the turntable 14. The spindle motor 12 is then driven to rotate the disc D through the turntable 14 at a high speed, and an optical pickup (not shown) is actuated. This enables information to be reproduced from the disc D, recorded onto the disc D or erased from the disc D.

In order to prevent an unbalanced state or deviation of center of gravity as mentioned before, the following means are implemented for the present invention. That is, an annular groove 26 is formed, about a center axis O of the rotation shaft 12a, at a location between the magnet ring 20 and the disc holding frame 18, as shown in FIGS. 3 to 5. A plurality (eight in this embodiment) of partition walls 28 are formed circumferentially spaced at a predetermined interval. That is, the frame main body 18 is formed with the annular groove 26 integrally having the partition walls 28. This provides a plurality (eight in this embodiment) of accommodating portions 26a to the annular groove 26. Each accommodating portion 26a accommodates therein a predetermined number (one in this embodiment) of steel balls 30 for unbalance correction. That is, the divided annular groove 26, i.e. the accommodating portion 26a, accommodates therein one steel ball 30 such that the partition walls 28 restricts the steel ball from moving in a circumferential direction of the annular groove 26. That is, the partition walls 28 serve as a member to restrict the steel balls 30a from moving in the circumferential direction. Note that two or more steel balls 30, although one in this embodiment, may be accommodated in each accommodating portion 26a.

In the present invention, the accommodating portions 26a were provided in a continuous fashion by forming the partition walls 28 in the annular groove 26. It is however, easy to contemplate such a modification that has separate accommodating portions in an annular arrangement. The number of the accommodating portions 26a may be arbitrary, but preferably in a range of "from to 2 to 10". If the number of the accommodating portions 26a becomes "11" or more, the range over which the steel ball 30 can move is too narrow to effectively correct for unbalance.

The width H of the annular groove 26, i.e., the accommodating portion 26a, is determined preferably in a range of from 1.5 to 5 times a diameter of the steel ball 30. This is because, in such a range, the steel ball 30 is allowed to somewhat displace in a turntable radial direction within the accommodating portion 26a. More specifically, if it is assumed that the diameter of the steel ball 30 is 3 mm, then the width H of the annular groove 26 or accommodating portion 26a is determined in a range of from 4.5 mm to 15 mm. If the width H is excessively small, the movable amount of the steel ball 30 in the radial direction is decreased, excessively decreasing the amount of unbalance correction. If the width H is excessively great, the movable amount of the steel ball in the radial direction is large excessively increasing the amount of unbalance correction.

Meanwhile, the magnetic attracting force on the magnet ring 20 is optimally determined in the following manner. That is, the magnetic attractive force on the magnet ring 20 is determined in such a range that the steel ball 30 is attracted to an inner side of the inner wall of the annular groove 26 or accommodating portion 26a by overcoming a centrifugal force caused due to rotation of the turntable 14 when the center of gravity G of the disc D is almost in coincident with the axis O of the rotary shaft 12a, i.e., when there is no unbalanced state or deviation of center of gravity, but is allowed to move toward an outer side of the inner wall of the annular groove 26 or accommodating portion 26a by being overcome by the centrifugal force due to the rotation of turntable when the center of gravity G of the disc D is deviated from the axis O of the rotary shaft 12a, i.e., when there is an unbalanced state or deviation of center of gravity.

More specifically, the attractive force F is determined to fulfill the following two equations provided that the magnetic attractive force of the magnet ring 20 is F, the mass of the steel ball 30 is m, the distance between the steel ball 30 in position of attracted onto the inner side of the inner wall of the annular groove 26 or accommodating portion 26a and the axis O is ri, the distance between the steel ball 30 when moved to the outer side of the inner wall of the annular groove 26 or accommodating portion 26a and the axis O is ro, the r.p.m. of the turntable 14 is $\omega$, and the amount of unbalance correction is A.

$$F = m \cdot ri \cdot \omega \cdot \omega + A \cdot \omega \cdot \omega$$

$$A = m(ro - ri)$$

In this embodiment, a plurality of hooks 32 are formed upwardly extending at an appropriate interval from a peripheral edge of the frame main body 18a. On the other hand, the lid 18b has engaging holes 34 formed at locations corresponding to the hooks 32. Each engaging holes 34 has a step 34a formed inside thereof. Accordingly, the lid 18b is detachably attached to the frame main body 18a by engaging the hooks 32 with the respective steps 34a.

In the above embodiment, when the center of gravity G is deviated in position from the axis O, that is, when there is an unbalanced state or deviation in center of gravity, the magnetic attractive force F of the magnet ring 20 is overcome by the centrifugal force due to high-speed rotation of the turntable 14 as shown by a virtual line in FIG. 4. Accordingly, in proportion to a distance from the axis O to the center of gravity G, only one or two or more steel balls 30 only that is opposite in position to the center of gravity with respect to the axis O is moved toward the outer side of the inner wall of the annular groove 26 or accommodating portion 26a by the centrifugal force, thus creating a greater amount A of balance correction.

On the other hand, when the center of gravity G and the axis O are in coincident or almost coincident in position with each other, the magnetic attractive force of the magnet ring 20 overcomes the centrifugal force. On this occasion, the steel balls 30 are separated by the partition walls 28. Accordingly, the steel balls 30 are attracted onto the inner side of the inner wall of the annular groove 26 or accommodating portion 26a, thus maintaining a balanced state.

Figure 6:
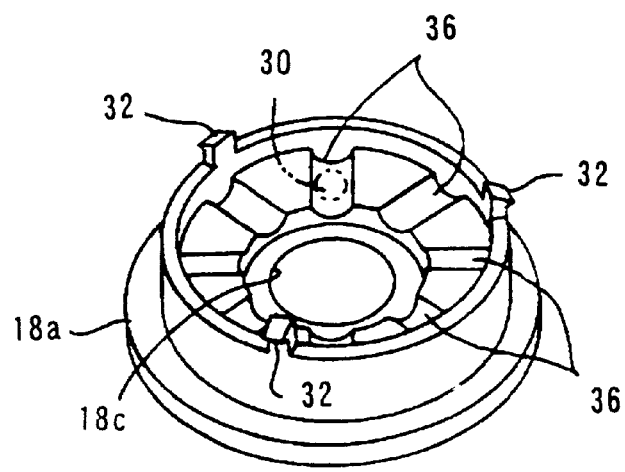
FIG. 6 is a perspective view showing essential parts of a modification to the embodiment.

In the above embodiment, the partition walls 28 were formed in the annular groove 26 in a manner of providing the accommodating portions 26a. Contrary to this, an embodiment in FIG. 6 has a plurality of grooves radially extending at a predetermined interval from a bottom surface of the annular groove 26 of the frame main body 18a. These grooves 26 are utilized as steel ball accommodating portions. In also this embodiment, the steel balls 30 are radially displaced by the rotation of the turntable 14, i.e., the disc D, thereby canceling an unbalanced state or deviation in center of gravity.

Figure 7:
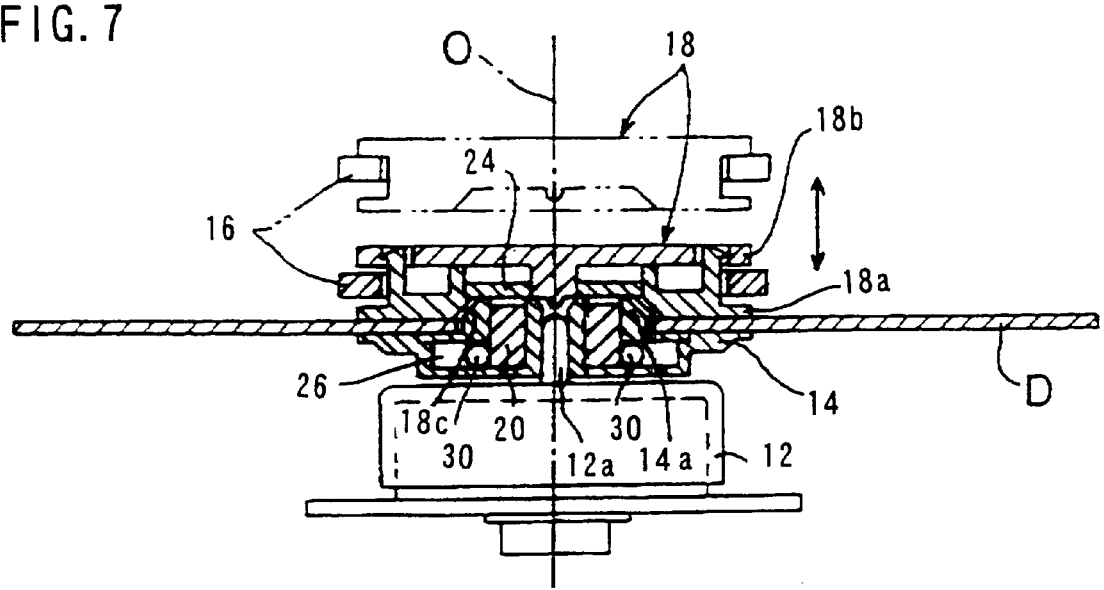
FIG. 7 is a sectional illustrative view showing essential parts of another modification.

In the above embodiment, the magnet ring 20 and the annular groove 26 were formed in the disc holding frame 18 while the magnetic ring 24 is provided in the turntable 14. Contrary to this, in an embodiment of FIG. 7 a magnetic ring 24 is provided in the disc holding frame 18 while a magnet ring 20 and an annular groove 26 are arranged in the turntable 14. In also this embodiment, when an unbalanced state occurs, the steel balls 30 are moved to a position opposite to a center of gravity G with respect to the axis O by the centrifugal force caused due to high-speed rotation of the turntable 14, as shown by the virtual line in FIG. 2. Due to this, the unbalanced state is canceled.

In each of the embodiments explained above, the steel balls 30 were used in such a manner of utilizing a magnetic attractive force of the magnet ring 20 provided associated to the turntable, in order to cancel an unbalanced state or deviation in center of gravity. In the case of using steel balls 30, there is a significant difficulty in optimally determining a magnetic attractive force F of the magnet ring 20. For example, the magnet ring 20, which holds the disc D through attracting the magnetic ring 24, requires a balance between a magnetic force therefor and a magnetic force to be acted on the steel ball 30.

On the contrary, the below-explained embodiment uses non-magnetic balls for unbalance correction. That is, non-magnetic balls are used as an unbalance correction means in order to exclude an adverse affection of the magnet ring 20.

Referring to FIG. 8, a disc player 10 in this embodiment includes a turntable 14 firmly fixed on a rotary shaft 12a of a spindle motor 12, similarly to the aforesaid embodiment. Note that in FIG. 8 a stator 12b of the spindle motor 12 and a rotor 12c arranged outside the stator 12b are distinctively illustrated.

In the FIG. 8 embodiment, a swing frame 16 is fitted over an outer periphery of the turntable 14 so that a disc holding frame 18 is supported by the swing frame 16. The holding frame 18 has a frame main body 18a having almost the same diameter as that of the turntable 14 and a lid 18b fitted on a top surface of the frame main body 18a. The frame main body 18a is formed at its center with an opening 18c. The lid 18b and the frame main body 18a has therebetween a space, at a central portion of which a ring magnet 20 is placed. The ring magnet 20 is fitted over an outer periphery of a projection 22 formed almost at a center of the lid 18b. The turntable 14 is formed at a center with a protrusion 14a having an annular recess formed therein. The annular recess receives therein a magnetic ring 24 formed, for example, of iron.

An annular groove 40 is formed in an underside surface of the turntable 14, as will be well understood in FIG. 9. In this annular groove 40, a plurality of non-magnetic balls 42 are accommodated or distributed to be movable in a circumferential direction of the turntable 14. The non-magnetic balls 42 may use an arbitrary non-magnetic material. In this embodiment, the non-magnetic balls 42 are formed, preferably, of brass. This is because brass has high specific gravity and hardness enough to effectively correct for an unbalanced state. The non-magnetic ball 42 is coated with a lubricative plating of a material such as tetrafluoroethylene resin, although not shown. This enables the non-magnetic ball to roll smoothly in the annular groove 40.

As will be well understood from FIG. 8, the annular groove 40 is open on a side facing to the spindle motor 12. Accordingly, the non-magnetic balls 42 will fall out if no measure is given for the annular groove 4. In this embodiment, a top surface of the rotor 12c of the spindle motor 12 serves to prevented the non-magnetic balls 42 from falling out. A lubricative plating using a material such as a tetrafluoroethylene resin may be applied to the spindle motor 12 at a portion of contacted with the non-magnetic balls 42. In place of such a lubricative plating, an appropriate resin sheet may be affixed onto a surface of the contact portion. In both cases, the contact resistance can be decreased between the non-magnetic ball 42 and the spindle motor 12.

In the embodiment of FIGS. 8 and 9, when an unbalanced state or deviation in center of gravity occurs, the non-magnetic balls 42 is moved to a position opposite to a center of gravity G with respect to the axis by the centrifugal force caused due to high-speed rotation of the turntable 14, thereby correcting an unbalanced state.

Figure 10:
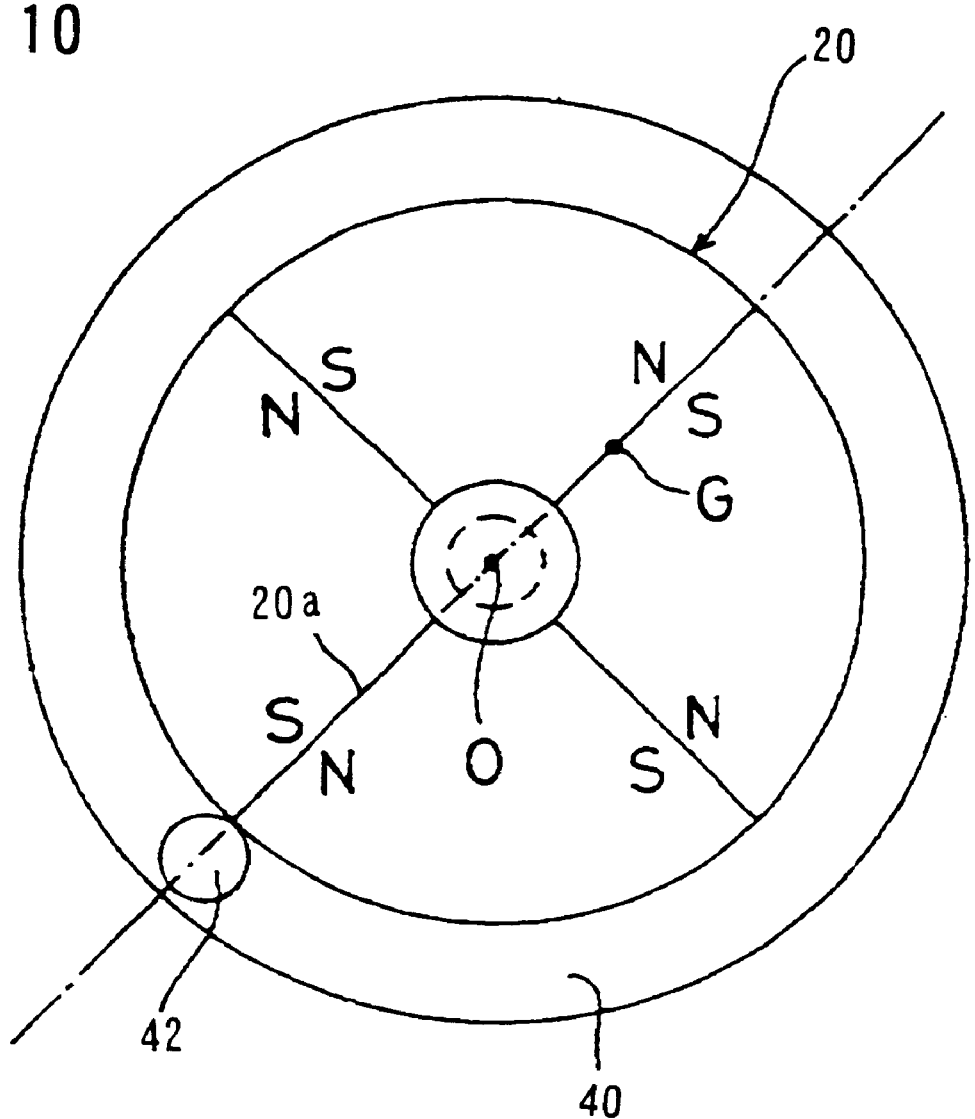
FIG. 10 is a plan illustrative view demonstrating an effect of the embodiment of FIG. 8 and FIG. 9.

More specifically, where the magnet ring 20 is divided in the circumferential direction as shown in FIG. 10, a pole boundary 20a is created within the magnet ring 20. If the non-magnetic ball 42 is assumed to be a steel ball alike the aforesaid embodiment, the steel ball cannot stay at the pole boundary 20a. This is because, if the steel or magnetic ball should exist at the pole boundary 20a, the magnetic ball is repelled by an N or S pole. As a result, the steel ball cannot stay at that position. Consequently, where a magnetic ball such as a steel ball is employed, even if the pole boundary 20a is at an optimal correcting position, the magnetic pole is difficult to stay at that position and accordingly the magnetic ball is deviated from the optimal correction position.

On the contrary, if a non-magnetic ball 42 is used as in the present invention, the non-magnetic ball 42 when positioned at the pole boundary 20a will not experience a repelling force of a magnet pole. Accordingly, the non-magnetic ball 42 is allowed to stay at the pole boundary 20a. It is therefore possible in the present invention to move the non-magnetic ball 42 to an optimal correcting position for optimally realizing unbalance correction.

When the center of gravity G and the axis O are in coincident or almost coincident with each other, no unbalanced state occur. In this state, the non-magnetic balls 42 are not affected by a magnetic attractive force of the magnet ring 20 or a leakage magnetic flux due to the spindle motor 12. Accordingly, the non-magnetic balls 42 are properly dispersed thereby maintaining a balanced state.

In the embodiment of FIGS. 8 and 9, the top surface of the rotor 12c of the spindle motor 12 serves also as a member to support the non-magnetic balls 42. Due to this, it is satisfactory to merely form an annular groove 40 in the underside of the turntable 14 and accommodate therein non-magnetic balls 42. This embodiment therefore makes it possible to provide a mechanism for correcting an unbalanced state by means of a simple structure.

In the above embodiment, the annular groove 40 for accommodating the non-magnetic balls 42 were formed at the underside of the turntable 14. In place of this, the annular groove 40 may be formed in a main body 18a of a disc holding frame 18 to accommodate therein an appropriate number of non-magnetic balls, as shown in the prior art of FIG. 1. In such a case, since the balance correcting balls in this embodiment are non-magnetic balls different from those of the FIG. 1 prior art, it is possible to avoid an adverse affection of a magnetic force of the magnet ring 20 similarly to the embodiment of FIGS. 8 and 9.

Incidentally, in the embodiment of FIGS. 8 and 9 there may be a case that the non-magnetic balls 42 are in direct contact with the top surface of the spindle motor 12 at a low speed rotation of the disc or turntable. Accordingly, there may be a case to generate noise due to contact of between the non-magnet balls 42 and the spindle motor 12 at low speed rotation.

Figure 11:
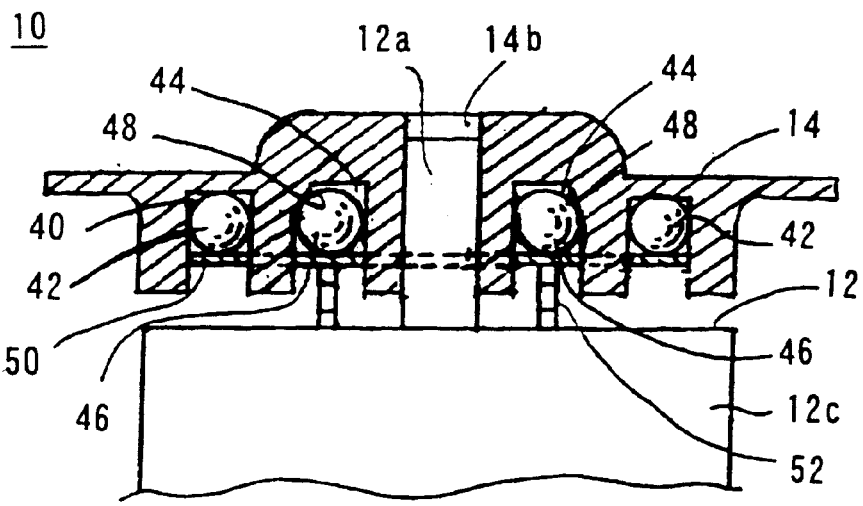
FIG. 11 is a sectional illustrative view showing essential parts of a disc player according to still another embodiment of the present invention.

It is possible to solve such a problem about noise by an embodiment shown in FIG. 11. This embodiment is similar to the embodiment of FIGS. 8 and 9, except for the following points. The same and similar constituent elements are denoted by the same difference characters, omitting duplicated explanations. Note that in FIG. 11 omittedly shown are the swing frame 16, disc holding frame 18, magnet ring 20, projection 22 and magnetic ring 24 of FIG. 8.

In the FIG. 11 embodiment, a turntable 14 is firmly fixed on the rotary shaft 12a of the spindle motor 12 inserted in a mount hole 14b. The turntable 14 has radial grooves 44 formed at an underside surface thereof at a location around the mount hole 14b. Spherical weights 46 are respectively received in the grooves 44 in a manner of displaceable in a radial direction of the turntable 14. The turntable 14 also has an annular groove 40 formed in the underside at an outer location of the radial grooves 44, similarly to the aforesaid embodiments. Within the annular groove 40, a plurality of non-magnetic balls 42 are accommodated movable in a circumferential direction of the turntable 14.

As shown in a section of the radial grooves 44 in FIG. 11, a taper surface 48 is formed at an outer side of the inner wall of the radial groove 44 such that the radial groove is broadened as its lower portion is approached, i.e., narrowed as a top portion is approached. This allows the weight 46 to move along the taper surface 48. The weight 46 may be in an arbitrary form other than the spherical form shown in the embodiment.

Furthermore, the FIG. 11 embodiment has a support plate 50 in a double-ring form interposed between the turntable 14 and the rotor 12c of the spindle motor 12, that is, at a location of beneath the non-magnetic balls 42 accommodated in the annular groove 40. The support plate 50 is steadily urged toward the turntable 14 by means of a spring 52 inserted between the support plate 50 and the rotor 12c. Consequently, both of the non-magnetic balls 42 loosely accommodated in the annular groove 40 and the weights 46 received in the radial groove 44 are upwardly urged at all times by the support plate 50 and the spring 52.

In the FIG. 11 embodiment, when the turntable 14 is rotated at a high speed, the weights 46 are moved downward along the taper surface 48 of the groove 44 by a centrifugal force, as shown in FIG. 11. This moves the support plate 50 downward against the urging force of the spring 52. Due to this, a gap is caused between the non-magnetic balls 42 and an annular groove 40 bottom plane so that the non-magnetic balls 42 are allowed to freely move within the annular groove 40. Accordingly, the non-magnetic balls 42 are moved to a position opposite to a center of gravity of the disc in a manner similar to the FIG. 8 embodiment, thereby canceling the unbalanced state. At this time, the non-magnetic balls 42 are rotating at the same r.p.m. as that turntable 14. Consequently, there is almost no generation of rolling sound of the non-magnetic balls 42.

Figure 12:
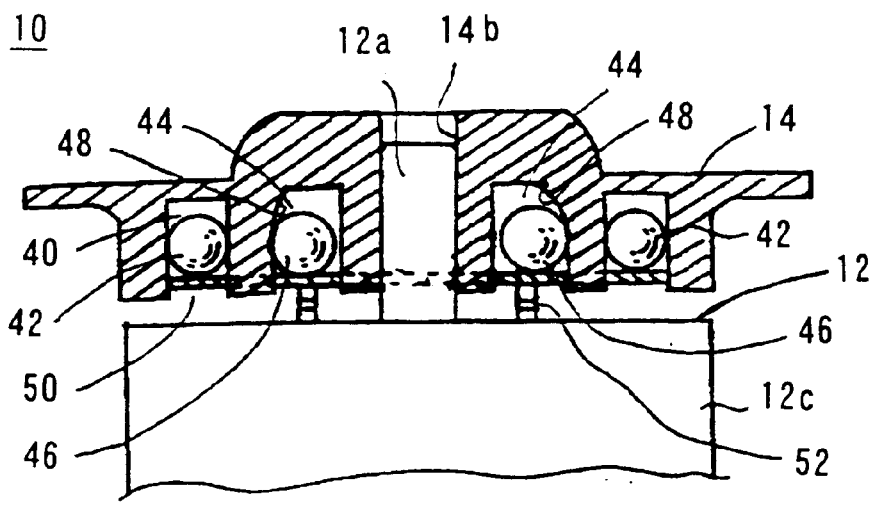
FIG. 12 is a sectional illustrative view demonstrating an effect of the FIG. 11 embodiment.
Figure 13:
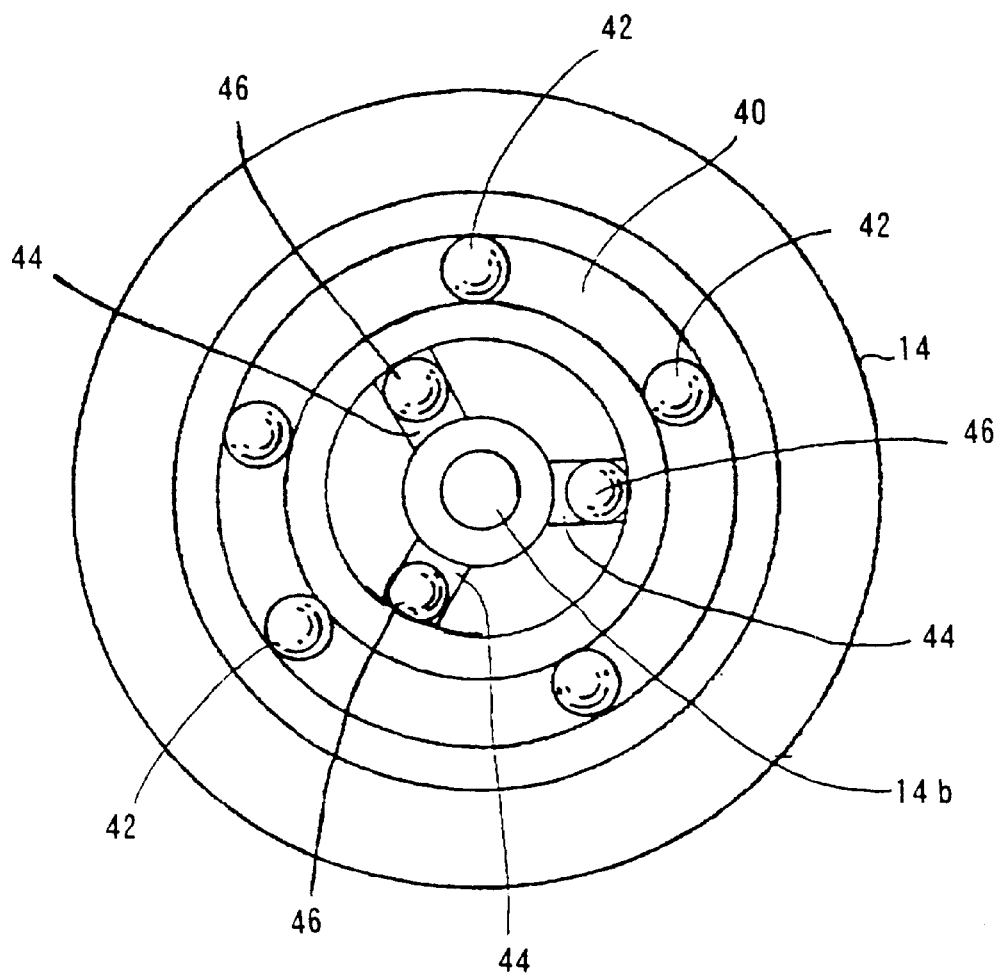
FIG. 13 is a plan illustrative view showing the FIG. 11 embodiment.

When the turntable 14 is rotated at a low speed, the support plate 50 is moved upward by the urging force of the spring 52 as shown in FIG. 12. Due to this, the non-magnetic balls 42 are clamped between the annular groove 40 bottom and the support plate 50 so that the non-magnetic balls 42 are held stationary within the annular groove 40. Accordingly, at low speed rotation the non-magnetic balls 42 will not rotate and there is no generation of rolling sound of the non-magnetic balls 42.

Incidentally, it is natural that the weights 46, which function to depress the support plate 50 downward during high-speed rotation, are allowed to move within a radial groove 44 movable range and will not constitute a cause of an unbalanced state or deviation in center of gravity.

Moreover, even where the disc player 10 is in a vertically-standing position, the support plate 50 is depressed toward the turntable 14, i.e., in a direction of fixing the non-magnetic balls 42, by the spring 52, and therefore there is no generation of rolling sound of the non-magnetic balls 42 similarly to the case of low-speed rotation.

Furthermore, the non-magnetic balls 42 in the FIG. 11 embodiment may be replaced by magnetic balls.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc rotating apparatus, comprising:

a drive motor having a rotary shaft;

a turntable firmly fixed on said rotary shaft;

a disc holding member for holding a disc mounted on said turntable cooperatively with said turntable;

a magnet provided on one of said turntable and said disc hold member;

a magnetic member provided on the other side of said turntable and said disc holding member and capable of being attracted by said magnet;

a plurality of accommodating portions arranged in one of a top surface and/or an underside surface of said turntable in a circumferential direction of said turntable;

a plurality of unbalancing correcting balls accommodated in said accommodating portions including a magnet ball;

wherein said magnet has a magnetic attractive force of such a magnitude that said magnet ball is caused to attract onto an inner peripheral surface of said accommodating portion by overcoming a centrifugal force caused by a high speed rotation of said turntable when a center of gravity of the disc mounted on said turntable and an axis of said rotary shaft are substantially coincident in position with each other, and said magnet ball is allowed to move toward an outer peripheral surface of said accommodating portion by being overcome by a centrifugal force due to the high speed rotation of said turntable when there is an unbalanced state or deviation in the center of gravity of said disc mounted on said turntable and the axis of said rotary shaft with respect to each other.

2. A disc rotating apparatus according to claim 1, wherein said accommodating portion has a width with respect to a radial direction of said turntable determined in a range of 1.5 to 5 times a diameter of said magnet ball.

* * * * *